United States Patent [19]

Billiett et al.

[11] Patent Number: 5,196,117
[45] Date of Patent: Mar. 23, 1993

[54] APPARATUS FOR SEPARATING OIL FROM AN OIL/WATER MIXTURE

[75] Inventors: Colin T. Billiett, Durham; Robert M. Fielding, Blyth; Anthony Harrop; Paul A. Feather, both of Chester le Street, all of England

[73] Assignee: Domnick Hunter Limited, County Durham, England

[21] Appl. No.: 818,755

[22] Filed: Jan. 9, 1992

[30] Foreign Application Priority Data

Jan. 9, 1991 [GB] United Kingdom ............... 9100369
Jul. 9, 1991 [GB] United Kingdom ............... 9114689

[51] Int. Cl.⁵ .................................................. B01D 24/14
[52] U.S. Cl. ............................... 210/265; 210/266; 210/260; 210/262; 210/DIG. 5
[58] Field of Search ............... 210/259, 260, 261, 262, 210/266, 799, DIG. 5, DIG. 8, 265

[56] References Cited

U.S. PATENT DOCUMENTS

| | | | |
|---|---|---|---|
| 2,713,919 | 7/1955 | Walker et al. | 210/261 |
| 3,558,482 | 1/1971 | De Young | 210/266 |
| 4,116,835 | 9/1978 | Bertelson | 210/DIG. 5 |
| 4,139,463 | 2/1979 | Murphy et al. | 210/259 |
| 4,145,280 | 3/1979 | Middlebeek et al. | 210/265 |
| 4,265,759 | 5/1981 | Verpalen et al. | 210/261 |
| 4,361,488 | 11/1982 | White et al. | 210/DIG. 5 |
| 4,426,293 | 1/1984 | Mason et al. | 210/636 |
| 4,859,329 | 8/1989 | Fink | 210/257.1 |
| 5,120,435 | 6/1992 | Fink | 210/192 |

FOREIGN PATENT DOCUMENTS 1158929 7/1969 United Kingdom .
2084480 4/1982 United Kingdom .

Primary Examiner—Stanley S. Silverman
Assistant Examiner—Cynthia L. Nessler
Attorney, Agent, or Firm—Darby & Darby

[57] ABSTRACT

Apparatus for separating oil from an oil/water mixture. The mixture is introduced into a vessel through entry ports and passes through a coalescing filter, flowing therethrough into a settlement chamber. Separation of oil and water occurs in the chamber and oil flows therefrom through an outlet to a waste collection vessel. Water is taken from the lower part of the chamber through a pipe and passes through a sorbent bed prior to discharge through an outlet located at a level below the level of the oil outlet opening.

12 Claims, 5 Drawing Sheets

APPARATUS FOR SEPARATING OIL FROM AN OIL/WATER MIXTURE

This invention relates to apparatus for separating oil from an oil/water mixture.

Oil/water separators are known which rely on settlement of the mixture to allow oil to be drawn off at a higher level than water, but these have limited efficiency as they are unable effectively to separate the oil/water emulsion which is also present in these mixtures.

It is becoming increasingly important to separate oils from contaminated water before discharging the water to the sewage system, in order to reduce pollution levels. Furthermore, if effective oil separation can be carried out by simple, on-site apparatus then the site operator's need for specialised waste collection can be significantly reduced.

According to the invention apparatus for separating oil from an oil/water mixture comprises a settlement chamber, a coalescing filter, an entry port for introducing the mixture into the coalescing filter for flow therethrough into the settlement chamber, an oil outlet opening from an upper region of the settlement chamber, a sorbent bed contained in a second chamber, a water outlet from a lower region of the settlement chamber through which water may flow to the sorbent bed, and a water outlet from the sorbent bed at a level below the oil outlet opening.

In operation, the oil/water mixture enters the device and passes through the coalescing filter. The action of this filter is to coalesce oil from the oil/water emulsion, to form free oil droplets, and thus very significantly to reduce the quantity of emulsion passing into the settlement chamber. In that chamber, free oil rises to the surface of the liquid within the chamber and flows therefrom through the oil outlet.

Water with a very low level of contaminant leaves the lower part of the settlement chamber from which it passes through the sorbent bed and thence from the device. The sorbent bed is effective to remove most remaining traces of oil, together with other impurities, and the water is sufficiently clean to enable it to be discharged directly to the sewage system without any significant pollution resulting therefrom. The oil can simply be allowed to accumulate until a sufficient quantity has been collected for economic disposal by a specialist.

It has been found that the level of contaminant remaining in the waste water leaving the device is less than 5 mg/l, a level that is significantly lower than previously achieved.

Preferably part of the coalescing filter, preferably from one quarter to one half of the filter area thereof and desirably about one third of that area, is located above the level of the oil outlet opening. Seperation of aerosol from air entering the apparatus with the liquid to be treated can thus be achieved, and there will be a silencing effect on that air.

The coalescing filter may simply extend directly into the liquid in the settlement chamber, but it is preferably contained within a third chamber having upper and lower outlets communicating with the settlement chamber, as in this way turbulence within the settlement chamber may be reduced. The third chamber may be located externally of the settlement chamber, but it is preferably within that chamber and depends from a closed top thereof. The coalescing filter is desirably a substantially cylindrical filter with its axis substantially vertical. The entry port then opens into the interior of the further chamber through the top of a vessel defining the settlement chamber.

This provides a very convenient arrangement, both as far as feed of the oil/water mixture to the device is concerned, and as far as replacement of the coalescing filter is concerned.

The sorbent bed may be of any suitable material that will effect the required removal action. The preferred material will usually be activated carbon, but materials such as activated alumina, zeolite or hydrophobic polyurethane foam may be used.

Conveniently the oil outlet comprises a funnel having an open upper end and connected to an outlet pipe extending through a wall of the settlement chamber. The funnel may be adjustable in height to allow oil drainage into the funnel at different levels.

It is possible for the settlement chamber and the second chamber to be side by side within a single vessel and separated by a dividing wall. Desirably, however, the second chamber is external of the settlement chamber and the water outlet from the settlement chamber communicates with a pipe extending through a wall of the settlement chamber. This makes replacement of the sorbent bed extremely simple, as access to the interior of the settlement chamber is not required.

Preferably water is directed from the lower region of the settlement chamber to flow to a delivery level above the level of the sorbent bed, and the water level from the sorbent bed comprises an outlet pipe extending upwardly from a lowermost part of the sorbent bed. Desirably the outlet pipe extends upwardly to a level above the top of the sorbent bed but below the delivery level.

Desirably the apparatus includes a sight glass and pressure relief valve exposed to the pressure within the coalescing filter. As the coalescing filter nears the end of its useful life, the pressure therein increases and air-/oil/water mixture can open the relief valve and give a visual indication that the filter should be replaced.

In order that the invention may be better understood a particular form of apparatus in accordance therewith will now be described in more detail, by way of example only, with reference to the accompanying drawings in which:

BRIEF DESCRIPTION OF THE DRAWINGS

Referring to FIGS. 1 to 4 the apparatus comprises a vessel 1, which may desirably be seamless and formed, for example, by rotational moulding of a suitable plastics material. The vessel is divided by an inserted cylindrical partition 2 into a chamber 3 lying within the partition and a chamber 4 lying outside the partition and forming a settlement chamber. Chamber 3 communicates with chamber 4 by way of a slot 5 cut in the wall of the partition 2 and a hole 6 in the bottom of that partition.

Figure 1:
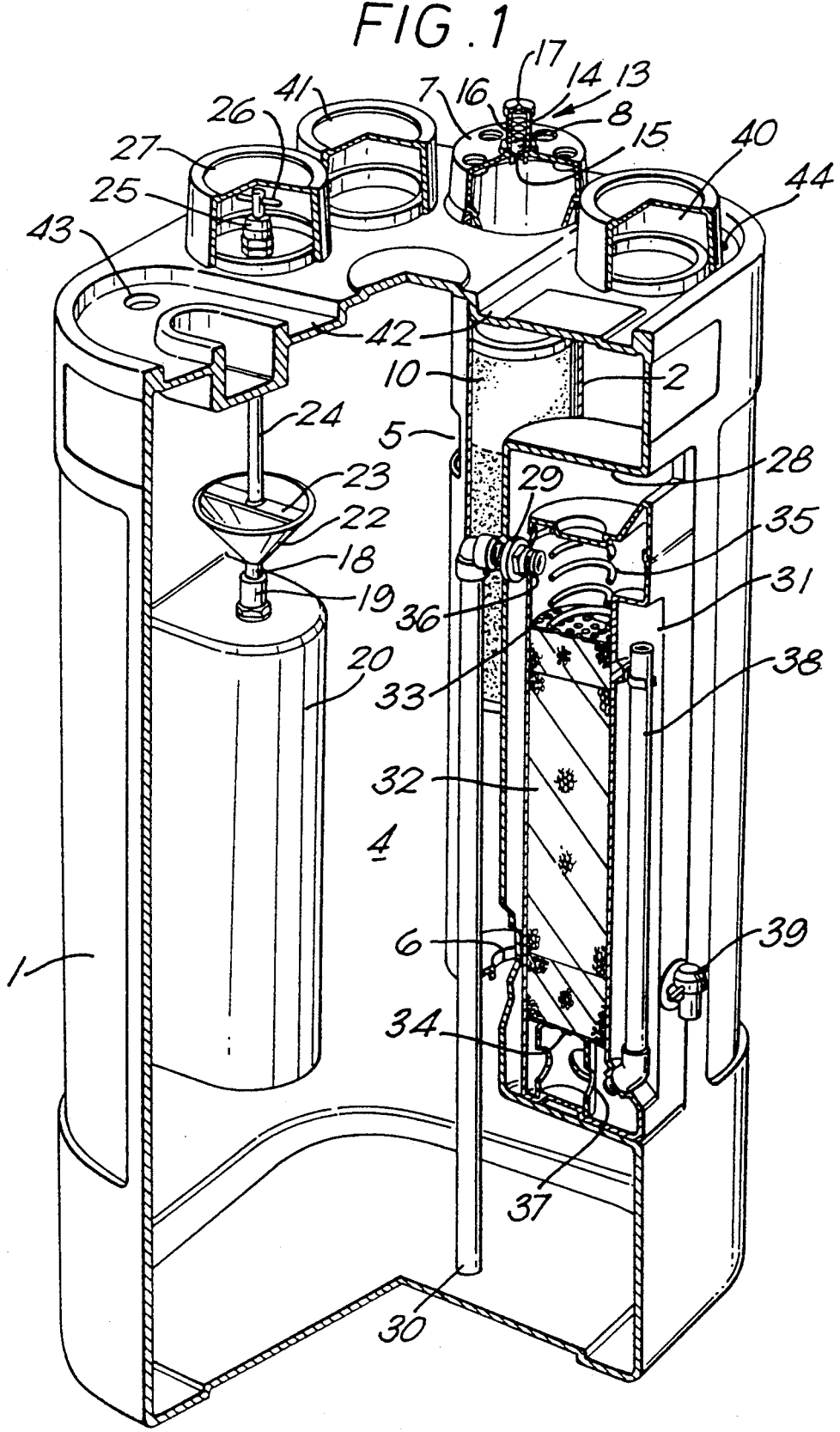
FIG. 1 is a part-sectional perspective view of a first embodiment of apparatus according to the invention.
Figure 2:
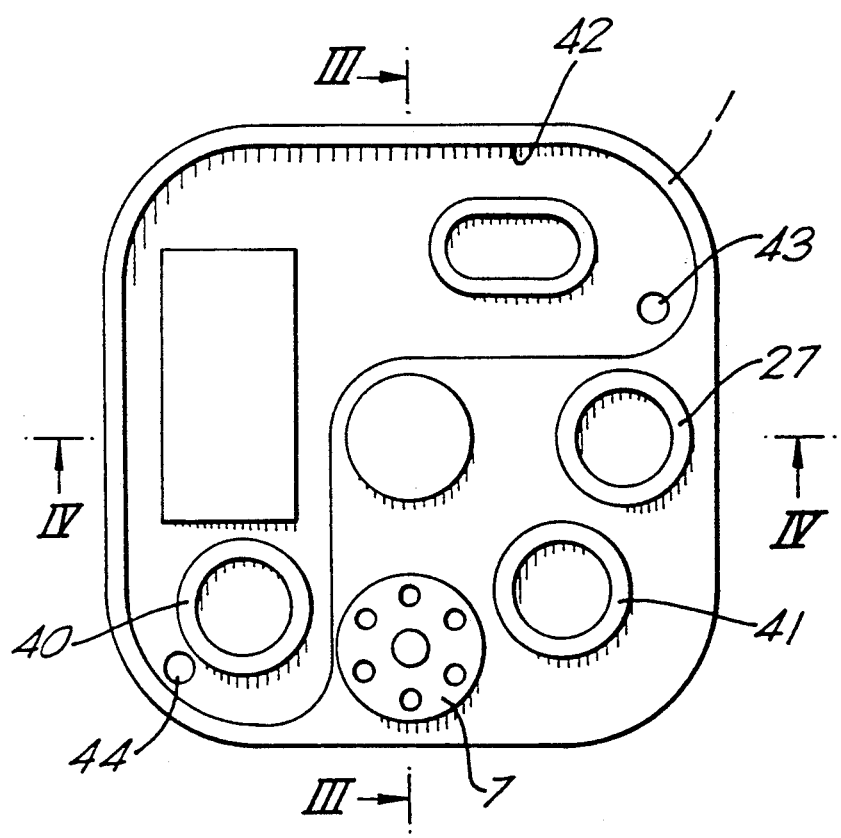
FIG. 2 is a top plan view of the apparatus of FIG. 1.
Figure 3:
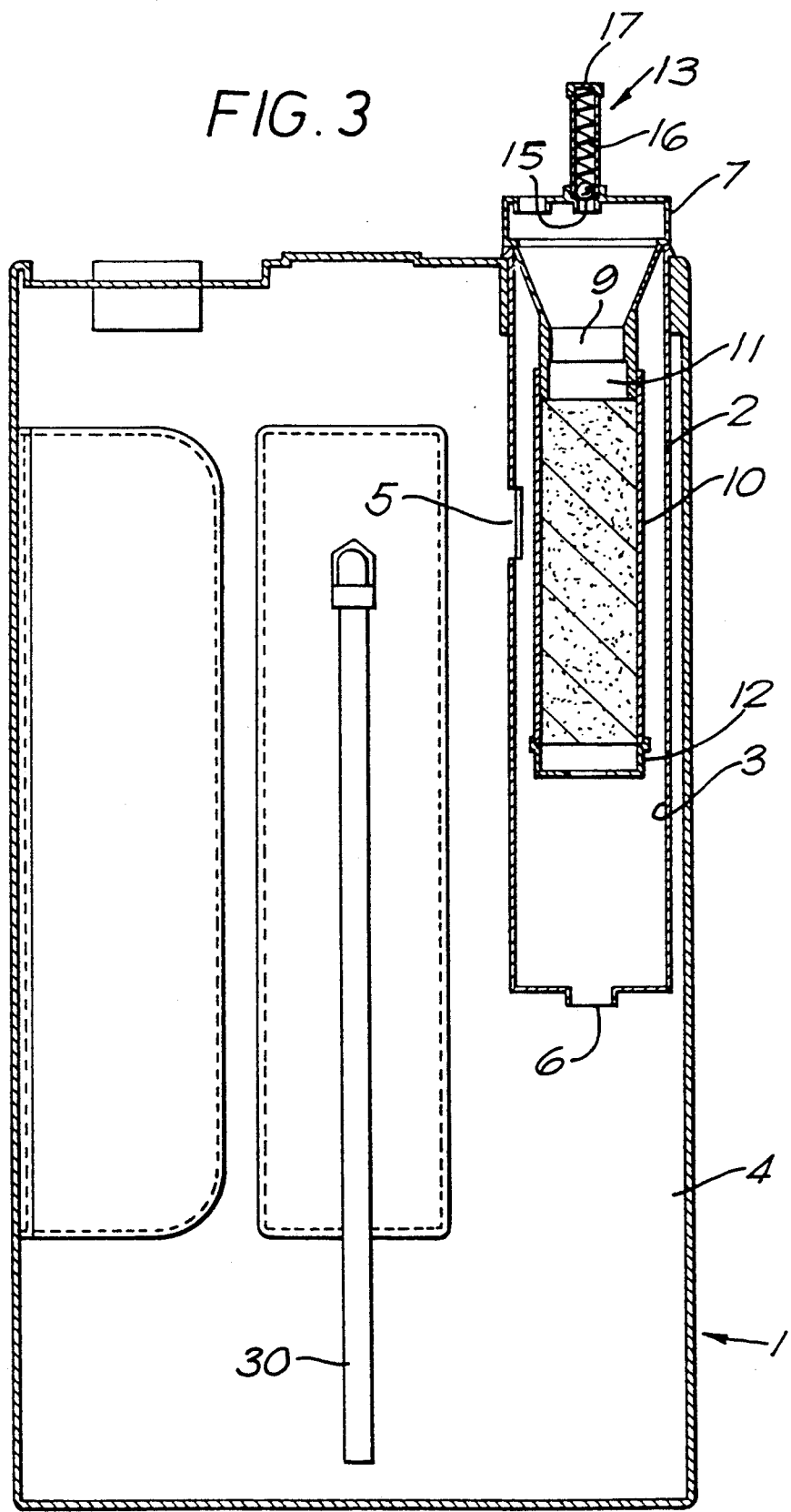
FIG. 3 is a section on line III—III of FIG. 2.
Figure 4:
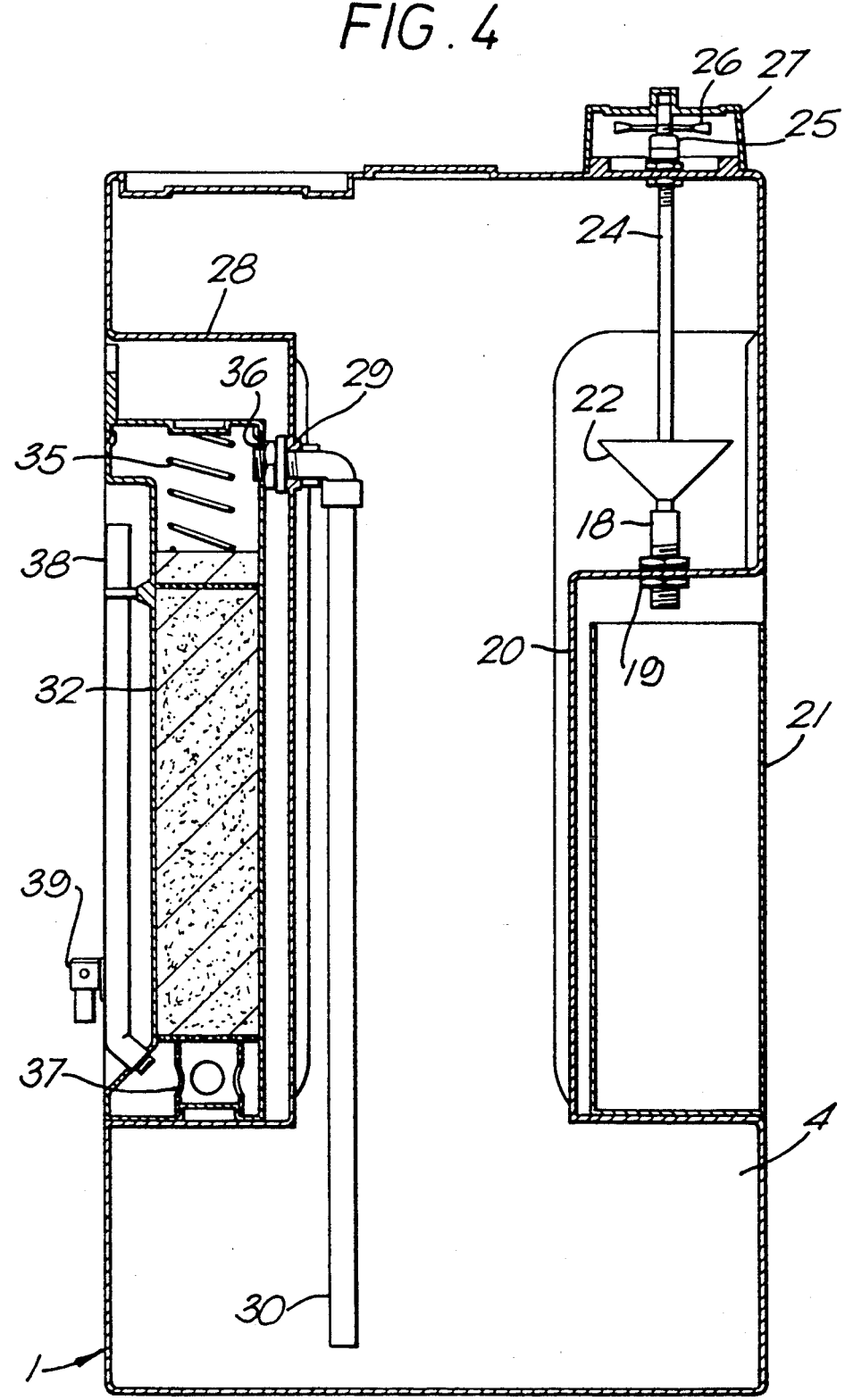
FIG. 4 is a section taken on the line IV—IV of FIG. 2.

The top of the vessel is fitted with an inlet manifold 7 which includes entry ports 8 for introducing oil/water mixture to be separated. An exit port 9 from the inlet manifold opens into the interior of a coalescing filter 10 mounted in the first chamber with its axis extending vertically within that chamber. An upper end cap 11 of the filter is detachably secured to the inlet manifold in order to support the filter within chamber 3. The coalescing filter is located so that part thereof, desirably about one-third of its length, is located above the level that will be the steady state liquid level when the apparatus is in use.

The coalescing filter itself may be of conventional construction, for example as described in GB-B-2128497 or GB-A-2198739. Thus, the filter comprises an upper end cap 11 and a lower end cap 12 between which extend inner and outer perforated metal cylinders, between which is sandwiched a cylinder of filter medium. The particular filter medium that is presently preferred is non-woven polypropylene fibre. compressed to a density to give the required filtering action. Other coalescing filter media could equally well be used, for example boro-silicate glass microfibre. The outer metal cylinder may be circumferentially surrounded by an anti-re-entrainment barrier, for example a sleeve of polyvinyl chloride coated foam or of non-woven polyester material.

Above the coalescing filter, the inlet manifold 7 incorporates a visually indicating pressure relief valve 13 comprising a clear plastic housing 14 within which a ball valve 15 is urged onto a seat by a compression spring 16. The housing has a vent hole 17 in the top thereof.

An oil outlet pipe 18 is located within the settlement chamber 4 and extends downwardly through a sliding seal secured by a bulkhead fitting 19 in a re-entrant section 20 of the vessel wall. The pipe can drain into an oil collection tank 21, desirably of a translucent plastics material, supported in the re-entrant section. A funnel 22 is secured to the upper end of the outlet pipe 18 and a support bar 23 extends across the open top of the funnel. A support rod 24 extends upwardly from the support bar 23 through a locking gland 25 in the upper wall of the vessel. A "T" bar 26 is secured to the upper end of the support rod 24 and protected by a removable cap 27. The height of the funnel may be adjusted by removing the cap 27, unlocking the gland 25, grasping the "T" bar to manually move the rod 24 and then re-locking the gland 25.

The vessel 1 has a second re-entrant section 28, with an opening in which a seal 29 is located. The upper end of a dip pipe 30 extends through the seal 29 and the pipe is secured to the wall of the re-entrant section 28 by a nut screwed on to a threaded end of the pipe. The dip pipe extends vertically downwardly within the settlement chamber 4 to the lower portion thereof.

An activated carbon filter 31 is supported in the re-entrant section 28. The activated carbon filter comprises a housing 32 packed with activated carbon between perforated end plates 33, 34 and mounted with its axis substantially vertical. The sorbent bed of activated carbon is maintained in compact form by a compression spring 35. An inlet 36 is formed in the upper part of the filter and can be located as a push fit on to the projecting end of the dip pipe 30. An outlet 37 is formed in the lower part of the filter, from which a discharge pipe 38 extends upwardly. The pipe 38 may be connected to drain into the sewage system.

A sample tap 39 is located part way up the activated carbon filter, and can be used to draw a water sample from the filter for analysis.

The top of the dip pipe 30 lies below the level of the upper rim of the funnel 22, and the top of the discharge pipe 38 lies below the level of the top of the dip pipe 30.

The top of the vessel is provided with removable inspection caps 40,41 and with a well section 42 having holes 43,44 therein. These perform the dual function of venting air from the settlement chamber and of allowing material spilt on the vessel top to drain into that chamber.

Operation of the apparatus will readily be understood. The apparatus is initially primed with clean water until steady state flow from the water outlet is attained. Thereafter, an oil/water mixture discharged for example from a compressor aftercooler or a compressed air ring main enters the system into the inlet manifold 7 and passes into the coalescing filter 10. Any air that is with the liquid escapes through the dry upper section of the filter above the liquid level within the settlement chamber 4, and that section of the filter acts to remove airborne aerosol and also has a silencing effect on the escaping air. The coalescing filter also separates oil from the oil/water emulsion that forms part of the mixture, so that the liquid emerging from chamber 3 into the settlement chamber 4 is part water and part oil droplets, with a remaining very low level of oil emulsion. Flow through the slot 5 is wholly or principally of air and oil, and flow through the hole 6 is principally of water. Within the settlement chamber 4 the liquids separate into three fractions, a lower fraction of water, an intermediate fraction of emulsion and an upper fraction of oil. The lower fraction of water passes through the dip pipe 30 into the activated carbon filter 31, and after passage through the carbon bed the water passes to discharge pipe 38.

In the steady state, the overall level of liquid in the settlement chamber 4 will be higher than the overall level in the activated carbon filter 30. There will be a constant flow of oil from the upper fraction in settlement chamber 4 outwardly through the pipe 18 and into the oil collection tank 21, and similarly there will be a constant flow of water from the lower fraction in chamber 4 into and through the activated carbon filter to the discharge pipe 38 and so to the sewage system.

The water flowing from chamber 4 is left with a low level of remaining contamination, and that contamination is reduced still further by passage of this water through the activated carbon filter 21. As a result of the coalescing filter action, the fractionating action and the action of the activated carbon filter the water leaving the system can exhibit contamination levels less than 5mg/l, well within acceptable standards for direct discharge into the sewage system.

The filter medium of the coalescing filter will, as time goes by, gradually become blocked by various solid contaminants that are present in the feed mixture. The internal pressure within this filter will thus tend to increase, and lift the ball 15 off its seat in the pressure relief valve 13, so giving an indication that the coalescing filter is becoming blocked and should be changed. The ball lift-off pressure may typically be 300 mbar above atmospheric pressure.

The activated carbon filter will also need changing at intervals. Checks can be made by periodically taking samples from sample tap 39 and the filter should be changed when the water quality is still above acceptable values. This change is extremely simple, due to the location of the filter externally of the vessel 1.

Figure 5:
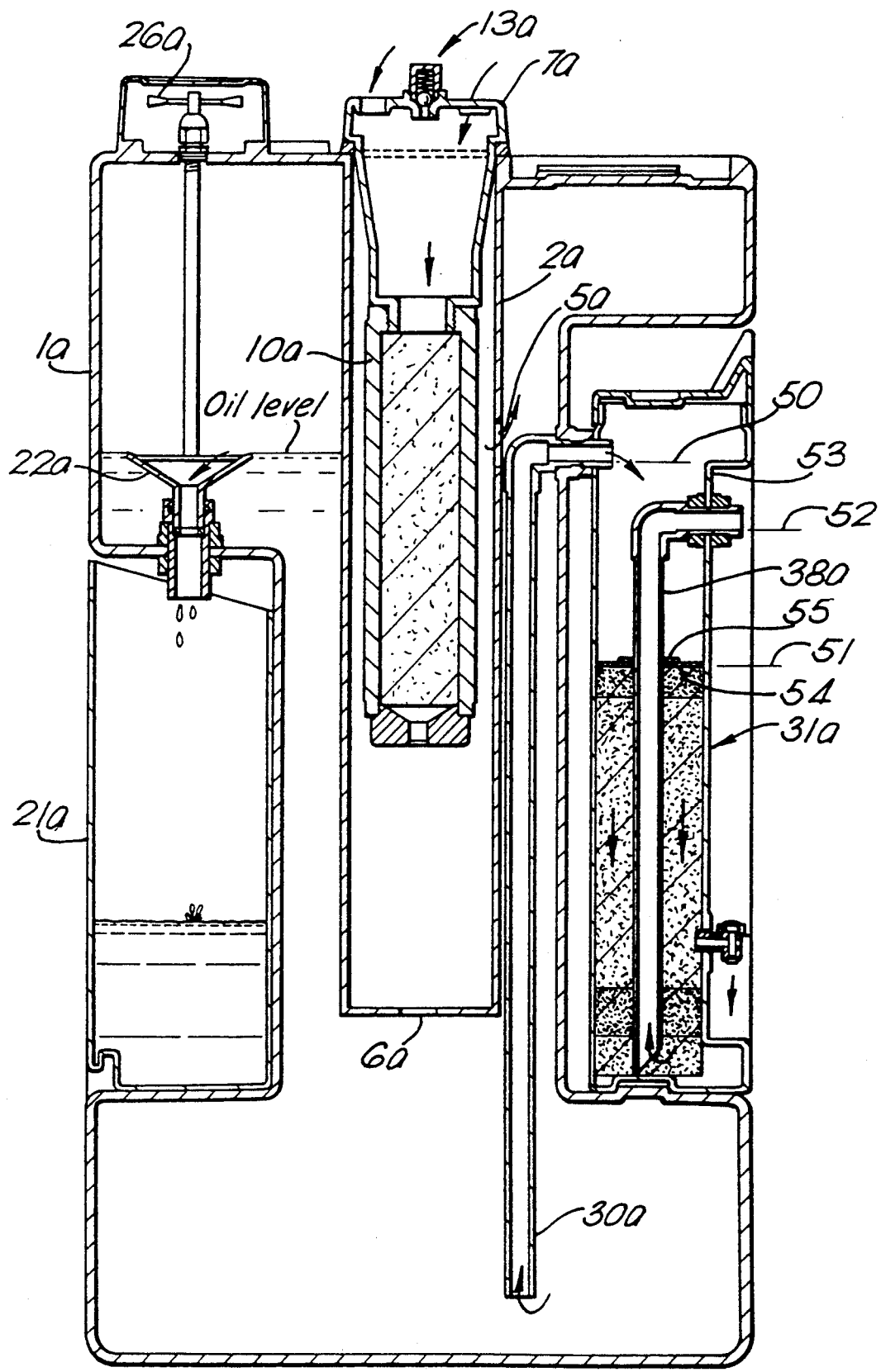
FIG. 5 is a schematic sectional drawing of a second embodiment of apparatus according to the invention.

FIG. 5 shows a second embodiment of apparatus which in many ways is similar to that of FIG. 1, and corresponding parts are shown by the same reference numerals used for FIG. 1 with the suffix a. The principal difference resides in the arrangement of the activated carbon filter 31a. In this embodiment the dip pipe 30a extends upwardly to a delivery level 50 that is above the level 51 of the upper part of the activated carbon sorbent bed. In addition, the discharge pipe 38a extends upwardly through the sorbent bed from the bottom thereof to a clean water outlet level 52 that lies between levels 50 and 51. This arrangement ensures a constant level of water above the sorbent bed, so that if there should be any small transfer of oil through dip pipe 30a this will float within the cylindrical housing 53 in which the sorbent bed is contained and will not contaminate that bed. The bed may be maintained in a compressed state by a porous disc 54 located on top of the bed and held by a locking washer 55 secured on the outside of discharge pipe 38a.

It will be appreciated that the particular arrangement of the apparatus may vary from that shown in the drawings. Using re-entrant sections of the main settlement vessel to accommodate the activated carbon filter and the oil collection tank leads to a particularly compact and elegant design. However, these are not necessary and other arrangements could be used. Leading the discharge pipe from the activated carbon filter upwardly for virtually the full height of that filter increases dwell time of water in the carbon bed for higher filtering efficiency. A similar effect could be achieved by having upward flow through the filter, water being led from the settlement vessel at a lower part thereof for connection to the filter. In such arrangement a valve would be necessary in that connection to prevent drainage from the settlement chamber during replacement of the activated carbon filter.

In general, separation performance increases with longer residence time, i.e., improves inversely in relation to flow velocity through the apparatus, so that design to encourage low flow velocities is advantageous.

We claim:

1. Apparatus for separating oil from an oil water mixture comprising a settlement chamber, a coalescing filter, an entry port comprising a means for introducing the mixture initially into the coalescing filter for flow therethrough into the settlement chamber, an oil outlet opening from an upper region of the settlement chamber, a sorbent bed contained in a second chamber, a water outlet from a lower region of the settlement chamber through which water may flow to the sorbent bed, a water outlet from the sorbent bed at a level below the oil outlet opening, said coalescing filter including a cylinder of filter medium depending from a closed top of the settlement chamber with the axis of the cylinder substantially vertical, and the entry port opening into the interior of the cylinder through the top of the settlement chamber.

2. Apparatus according to claim 1 in which part of the coalescing filter is located above the level of the oil outlet opening.

3. Apparatus according to claim 1 in which the coalescing filter is contained within a third chamber having upper and lower outlets communicating with the settlement chamber.

4. Apparatus according to claim 3 in which the third chamber is located within the settlement chamber and depends from a closed top of the settlement chamber.

5. Apparatus according to claim 1 in which the oil outlet comprises a funnel having an open upper end and connected to an outlet pipe extending through a wall of the settlement chamber.

6. Apparatus according to claim 1 and including a sight glass and pressure relief valve exposed to the pressure within the coalescing filter.

7. Apparatus for separating oil from an oil water mixture comprising a settlement chamber, a coalescing filter, an entry port comprising a means for introducing the mixture initially into the coalescing filter for flow therethrough into the settlement chamber, an oil outlet opening from an upper region of the settlement chamber, a sorbent bed contained in a second chamber, a water outlet from a lower region of the settlement chamber through which water may flow to the sorbent bed, and a water outlet from the sorbent bed at a level below the oil outlet opening, said sorbent bed including activated carbon packed into a cylindrical housing mounted in the second chamber with the axis of said housing being substantially vertical.

8. Apparatus according to claim 7 in which the second chamber is external of the settlement chamber, and the water outlet from the settlement chamber includes a pipe extending through a wall of the settlement chamber.

9. Apparatus according to claim 7 in which water is directed from the lower region of the settlement chamber to flow to a delivery level above the level of the sorbent bed, and the water level from the sorbent bed comprises an outlet pipe extending upwardly from a lowermost part of the sorbent bed.

10. Apparatus according to claim 9 in which the outlet pipe extends upwardly to a level above the top of the sorbent bed but below the delivery level.

11. Apparatus according to claim 7, wherein the oil outlet comprises a funnel having an opening upper end and connected to an outlet pipe extending through a wall of the settlement chamber.

12. Apparatus according to claim 7, further including a sight glass and pressure relief valve exposed to the pressure within the coalescing filter.

* * * * *